No. 770,453. PATENTED SEPT. 20, 1904.
F. H. CURTIS.
WINDOW CLEANER.
APPLICATION FILED OCT. 7, 1903.
NO MODEL.
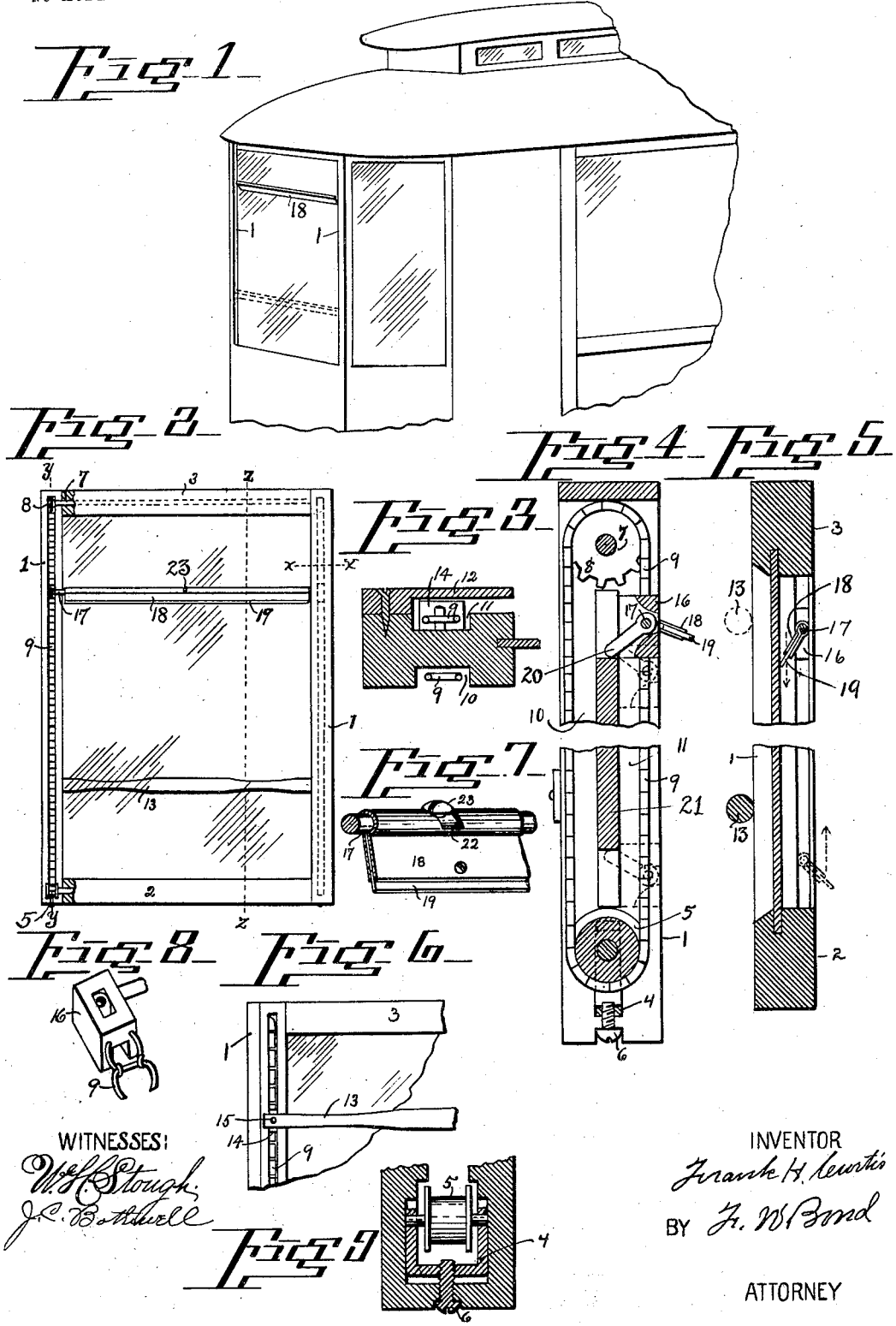

No. 770,453.                                                                                    Patented September 20, 1904.

UNITED STATES PATENT OFFICE.

FRANK H. CURTIS, OF CANTON, OHIO.

WINDOW-CLEANER.

SPECIFICATION forming part of Letters Patent No. 770,453, dated September 20, 1904.

Application filed October 7, 1903. Serial No. 176,042. (Model.)

*To all whom it may concern:*

Be it known that I, FRANK H. CURTIS, a citizen of the United States, residing at Canton, in the county of Stark and State of Ohio, have invented certain new and useful Improvements in Window-Cleaners; and I do hereby declare that the following is a full, clear, and exact description of the same, reference being had to the annexed drawings, making a part of this specification, and to the figures of reference marked thereon, in which—

Figure 1 is a view showing the end of a street-car and illustrating the cleaner in proper relative position. Fig. 2 is a view showing the window-frame and illustrating my improvements connected thereto, showing one of the closing-strips removed. Fig. 3 is a transverse section taken on line $x\,x$, Fig. 2. Fig. 4 is a longitudinal section taken on line $y\,y$, Fig. 2. Fig. 5 is a longitudinal section taken on line $z\,z$, Fig. 2. Fig. 6 is a view showing a portion of the window-frame, illustrating one of the scraper-carrying chains, showing the operating handle or bar connected thereto. Fig. 7 is a view showing a portion of the scraper-clamp properly located upon its rod and illustrating one of the slots and set-screws. Fig. 8 is a detached view of one of the scraper-rod sliding heads, showing the chain connected thereto. Fig. 9 is a view of one of the chain-rollers, showing its adjusting-yoke.

The present invention has relation to window-cleaners especially designed to clean frost and snow or other substances liable to accumulate upon the outer and front face of the pane of glass located in the window of a street-car and directly in front of the motorman. This use, however, is considered the most important; but it will be understood that my improved window-cleaner can be attached and operated without regard to the particular window or window-pane, and hence the above-mentioned use is only one, as it will be understood that the object is to quickly clean accumulations of any kind from the pane of a window.

I have illustrated my improvement as operating vertically, owing to the fact that this would be the natural way when applied as illustrated in the drawings.

Similar numerals of reference indicate corresponding parts in all the figures of the drawings.

In the accompanying drawings, 1 represents the vertical side rails of the window-frame, to which are attached the top and bottom bars 2 and 3, which rails and bars constitute a rectangular frame, to which rectangular frame the pane of glass is attached in the usual manner. To the bottom or lower portion of the frame or to the lower sash-bar 2 are attached the adjustable yokes 4, to which yokes are journaled the pulleys 5. For the purpose hereinafter described the screws 6 are provided, which screws engage screw-threaded apertures formed in the shanks of the yokes 4. The upper sash-bar 3 is provided with the shaft 7, which shaft is properly journaled at or near its ends and has securely mounted thereon the sprocket-wheels 8, over which sprocket-wheels are located the chains 9, which chains extend downward and around the pulleys 5, and for the purpose of concealing the chains they are located in grooves 10 and 11, and for the purpose of giving the window-frame a finished appearance cap-strips 12 are provided. For the purpose hereinafter described the partitions between the grooves 10 and 11 terminate a short distance from the tops and bottoms of the sash-rails, as illustrated in Fig. 4. To the chains 9 is attached the operating handle or bar 13, which handle or bar is attached by means of blocks or plates 14, said blocks or plates being attached to a link or links of the chain members, preferably by means of screws 15 and their equivalents. It will be understood that the manner of attaching the operating handle or bar 13 is immaterial, inasmuch as the only object designed to be accomplished is to so connect the handle or bar that as it is moved up and down it will carry with it the chains 9, and of course as the handle is moved upward it will carry the inner members of the chain upward and move the outer members of the chain downward, and vice versa. To each outer member of the chains 5 are attached the blocks or heads 16, which blocks or heads are for the purpose of journaling the ends of the scraper-shaft 17, to which scraper-shaft is adjustably connected the scraper-holding clamp 18, which scraper-holding clamp is formed of metal, which is bent around the shaft 17 and extended, as illustrated in the drawings, so as to provide means for attaching the scraper 19, which scraper is formed of rubber or the like material, and of course its exposed edge is to come in contact with the glass designed to be cleaned. To the shaft 17 are securely attached the fingers 20, which fingers are located at an angle to the scraper 19 and its clamp 18. It will be understood that in use during the downward movement of the scraper it should come in contact with the glass, so that any substance adhering to the glass may be moved downward with the downward movement of the scraper and as the scraper moves downward remove the same from the glass. It will also be understood that as the scraper is moved upward it should be removed from the glass, so as to prevent any contact therewith in order to accomplish these results. The grooves 11 are formed of sufficient depth to allow the fingers 20 to travel back and forth in said grooves.

The operation is as follows: Assuming the operating-handle 13 to be lowered until the scraper-shaft 17, together with the different parts carried thereby, is elevated until the fingers 20 come above the tops of the partitions 21, at which time the scraper-clamp 18 and the scraper 19 will by gravity assume a vertical position, or substantially so, which in turn will elevate the free ends of the fingers 20, when the operating-handle 13 is lifted or moved upward the inner ends of the fingers 20 will come in contact with the upper ends of the partitions 21 and tilt the fingers upward, which in turn moves the scraper-clamp 18 and the scraper 19 at an angle, so as to bring the scraper 19 in contact with the face of the glass, it being understood that the fingers will move down the groove 11 and the ends of said fingers ride upon the seats of the grooves. When the scraper has been brought to a position so as to bring the fingers 20 to a point below the bottom or lower ends of the partitions 21, the scraper is again free to swing outward and away from the glass, and as said scraper is moved upward the fingers 20 will be tilted in the opposite direction to that assumed when the scraper is moved down, thereby holding the scraper out of contact with the outer face of the glass.

For the purpose of adjusting the frictional contact of the scraper 19 upon the face of the glass, the angularity as between the fingers 20 and the scraper 19, together with the clamp 18, said clamp is provided with any desired number of elongated slots 22, through which slots are passed set-screws 23, said set-screws being seated in the scraper-shaft 17. It will be understood that by loosening the set-screws 23 the scraper-clamp 18, together with the scraper 19, may be adjusted at any desired angle, and when brought into the desired adjustment the set-screws 23 are tightened, so that their heads will bind the scraper-clamp and hold it in fixed position relative to the scraper-bar shaft 17. It will be understood that in order to properly operate the scraper the tension of the chains 9 should be uniform, and in order to accomplish this result the pulleys 5 are journaled to the yokes 4, which yokes are located or held by the screws 6. It will be understood that by turning the screws in one direction will move the yokes 4 downward and by turning the screws in the opposite direction will move the yokes upward, thereby regulating the distance between the pulleys 5 and the sprocket-wheels 8. It will be understood that by securely mounting the sprocket-wheels 8 upon the shaft 7 the two chains 9 will move in unison, by which arrangement one end of the scraper 19 cannot move in advance of the opposite end thereof.

Having fully described my invention, what I claim as new, and desire to secure by Letters Patent, is—

In a window-cleaner, a frame each of the side bars thereof being provided with front and rear longitudinal grooves, the said grooves being extended through the side bars at the ends thereof to provide upper and lower slots and a partition therebetween, a shaft revolubly mounted at the upper portion of said frame, sprocket-wheels rigidly secured to said shaft and situated within said upper slots, adjustable brackets in the lower part of said frame, pulleys in said lower slots and having their bearings in said adjustable brackets, sprocket-chains passing over said sprocket-wheels and pulleys and lying in said grooves, a handle-bar secured to each of said sprocket-chains at the rear of the frame, bearings carried by the sprocket-chains in said front grooves, a wiper-shaft revolubly mounted in said bearings, a wiper-clamp adjustably secured to said wiper-shaft, a wiper in said wiper-clamp, fingers secured to said wiper-shaft at an angle to said wiper, the fingers extending into the upper and lower slots when the wiper is at the top and bottom of the frame respectively and engaging the partition between the front and rear grooves to turn and hold the wiper in operative position during its movement in one direction and in inoperative position during its movement in the opposite direction.

In testimony that I claim the above I have hereunto subscribed my name in the presence of two witnesses.

FRANK H. CURTIS.

Witnesses:
JOHN C. BOTHWELL,
F. W. BOND.